Nov. 28, 1944.  E. V. SMITH  2,364,006
AIRPLANE WING
Filed Feb. 26, 1942  2 Sheets-Sheet 1
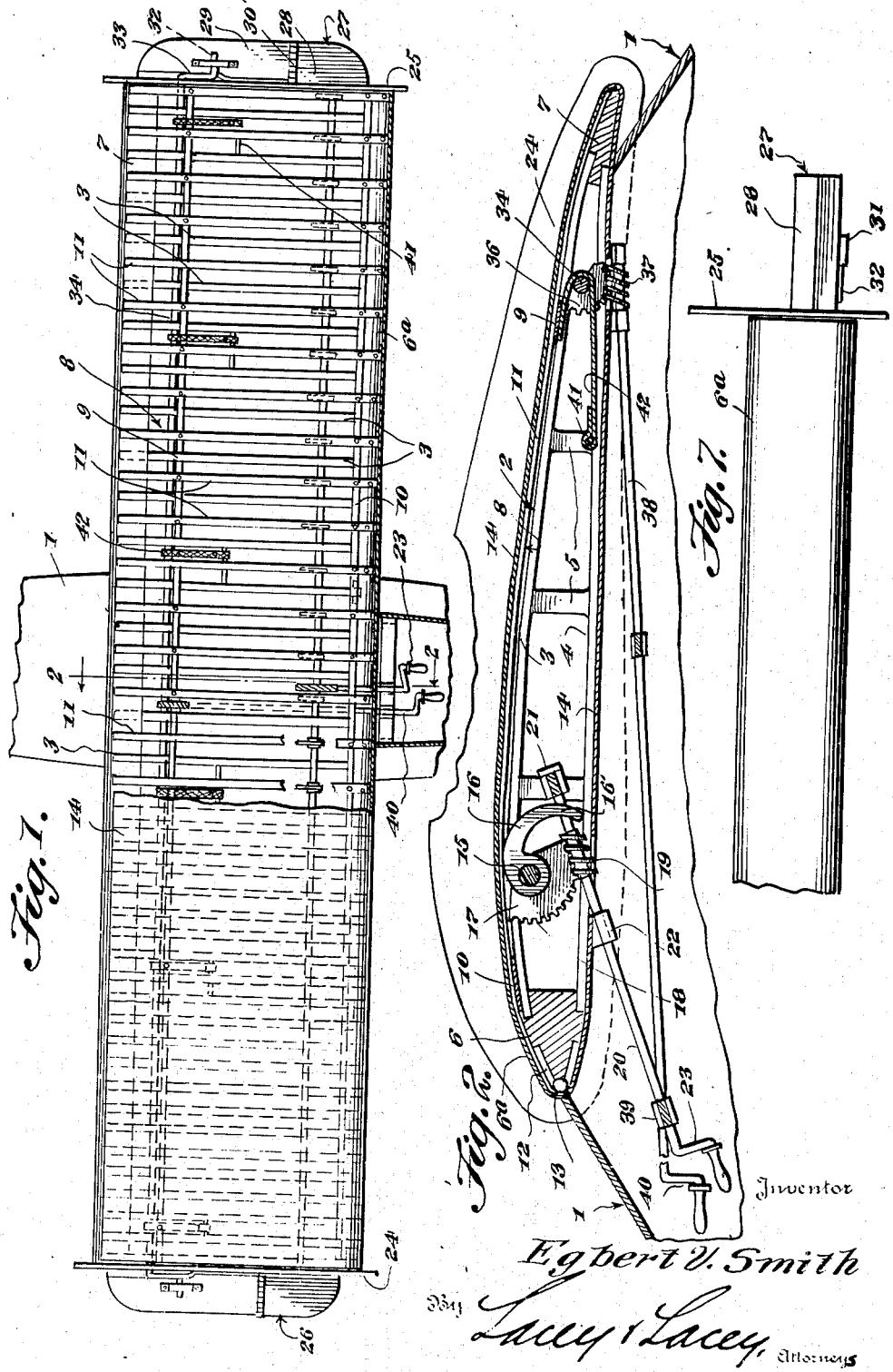

Nov. 28, 1944.   E. V. SMITH   2,364,006
AIRPLANE WING
Filed Feb. 26, 1942   2 Sheets-Sheet 2
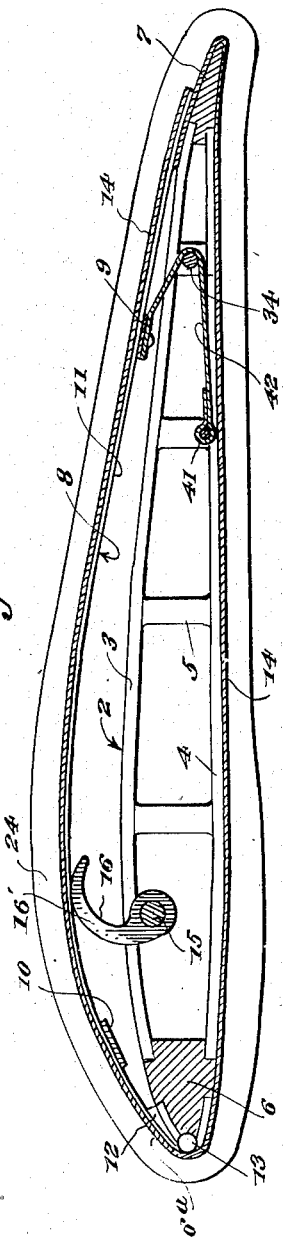
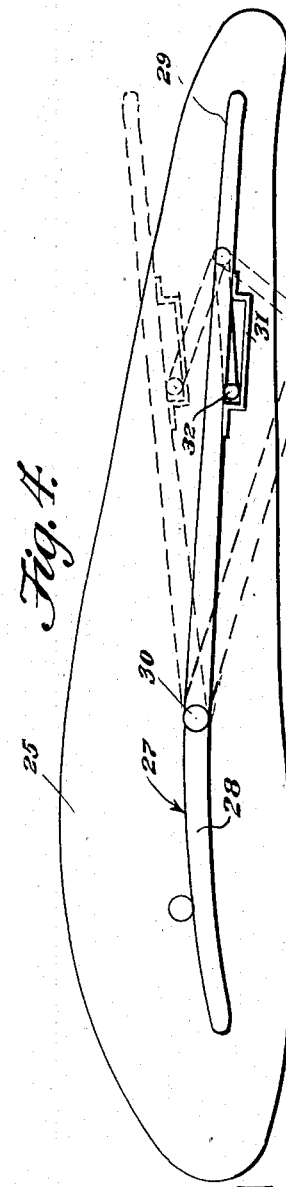
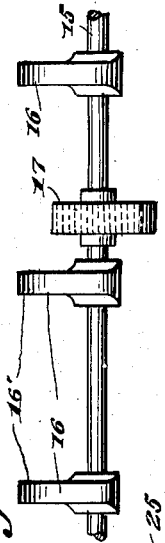
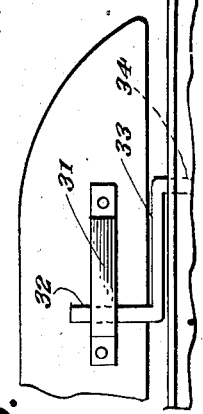
Inventor
Egbert V. Smith
By Lacey & Lacey,
Attorneys Patented Nov. 28, 1944

2,364,006

UNITED STATES PATENT OFFICE 2,364,006

AIRPLANE WING

Egbert V. Smith, Kerrville, Tex.

Application February 26, 1942, Serial No. 432,495

4 Claims. (Cl. 244—44)

This invention relates to air foils and more particularly to an improved airplane wing.

One object of the invention is to provide an airplane wing which is so constructed that it will serve a dual purpose, i. e., either to reduce drag, with the result that the aircraft will be allowed to obtain higher rates of speed, or to increase drag, with the result that more lifting power will be afforded for aiding in take-off, landing and slow flying.

Another object of the invention is to provide an airplane wing having improved mechanism for changing the camber thereof.

A further object of the invention is to provide an air foil of the character described wherein the mechanism for changing the camber may be controlled with facility from the cockpit.

Still another object of the invention is to provide an airplane wing employing improved mechanism for controlling the ailerons.

Still another object of the invention is to provide an airplane wing which is characterized by the maximum simplicity of construction and efficiency in operation.

Still further objects of the invention not specifically mentioned hereinbefore, will become apparent during the course of the following description.

In the drawings forming a part of my application:

Figure 1 is a top plan view of my improved airplane wing, the view being partly broken away.

Figure 2 is an enlarged transverse sectional view on the line 2—2 of Figure 1,

Figure 3 is a transverse sectional view showing my improved wing as it would appear with the camber increased, for increasing the lift of the wing, Figure 4 is an end view showing one of the ailerons employed and the mechanism for shifting said ailerons, Figure 5 is an enlarged detail bottom plan view of one of the ailerons, Figure 6 is a detail plan view showing a portion of the cam shaft with some of the cams employed and the sector gear thereon, and Figure 7 is an enlarged detail front elevation of the device.

In the drawings similar numerals of reference to designate like parts throughout the views.

The numeral 1 indicates a portion of the fuselage of an aircraft which is to be equipped with my improved wing. The fuselage 1 is of conventional construction and need not be described in detail.

My improved wing includes a rigid frame which is shown generally at 2. The frame 2 includes sub-frames each comprising a plurality of laterally spaced upper and lower members 3 and 4 which are connected by spaced struts 5. Connecting the members 3 and 4 at their corresponding forward ends is a block 6 which is shaped to define a leading edge 6ª for the wing. At their corresponding rear ends the members 3 and 4 are connected by a block 7 which is shaped to define a trailing edge for the wing. It should be understood that the blocks 6 and 7 extend throughout the length of the wing and that the center portions of said blocks are suitably secured to the fuselage.

Normally overlying the frame 2 is a resilient skeleton frame 8, said frame including longitudinally extending strips 9 and 10, which extend throughout the entire length of the wing. The strip 9, as best seen in Figure 2, is disposed near the trailing edge of the wing while the strip 10 is disposed near the leading edge thereof. The frame 8 includes a plurality of transversely extending resilient strips 11 which extend throughout the width of the wing and are disposed above the upper members 3 between adjacent pairs of said upper members. The strips 11 are each connected, near their corresponding forward and rear ends, with the strips 10 and 9. Said strips 11 have their corresponding forward end portions connected with straps 12 of hinges 13, said hinges being mounted on the leading edge of the block 6. The resilient skeleton frame 8 is thus mounted with its forward edge pivotally connected with the frame 2.

Extending between the blocks 6 and 7 and lying against the under surfaces thereof is covering material 14 which may be fabric, light weight metal or the like. The material 14 extends about the rear edge of the block 7 and forwardly along the upper surface of said block to the forward upper edge thereof. Said covering 14 also extends about the leading edge of the block 6 and rearwardly on the frame 8 throughout the entire width of said frame, the rear end of the covering overlying that portion of the covering on the upper surface of the block 7. In this connection it should be understood that the covering 14 is suitably secured to the strips 11 of the skeleton frame 8 and that said covering is of sufficient flexibility that flexing of the frame 8, in a manner to be described in more detail hereinafter, will be permitted.

In order to change the camber of the wing, to increase or decrease drag, I employ mechanism now to be described. Extending longitudinally of the wing within the frame 2 and beneath the members 3 thereof and near the block 6 is a cam shaft 15. Mounted on the cam shaft and disposed beneath each of the strips 11 near its forward end portion are rocker arms 16 terminating in cams 16'. Also mounted on the cam shaft substantially medially of its length and within the fuselage 1 is a sector 17 which is provided with teeth 18. The teeth 18 mesh with the thread of a worm 19 which is mounted on a shaft 20. The shaft 20, as best seen in Figure 2, has its upper end journaled in a bearing 21 and its intermediate portion journaled in a bearing 22, said bearings 21 and 22 being mounted on the forwardmost strut 5 and the lower member 4, respectively, of the center sub-frame of the frame 2. At its lower or forward end the shaft 20 is formed with an operating crank 23.

Mounted on the opposite ends of the wings are vertical fins 24 and 25, the fin 25 being shown in detail in Figure 7 of the drawings. The fins 24 and 25 define mountings for ailerons 26 and 27. The ailerons each include a stationary flap 28 and a movable flap 29 which is connected to said flap 28 by a hinge 30. Mounted on the under surfaces of the flap 29 are bearing loops or straps 31 which receive the end portions 32 of cranks 33. The cranks 33 are formed integrally with an aileron shifting rod 34 which extends longitudinally of the wing throughout its length and projects through the fins 24 and 25. The rod 34 is provided with a sector gear 36 which is adapted to mesh with a worm gear 37 carried on the rear end of an adjusting shaft 38. The forward end portion of the adjusting shaft 38 is mounted in a bearing 39 and said shaft 38 terminates at its forward end in a crank 40 which is similar to the crank 23 and is disposed for convenient manual engagement by the pilot. It will now be seen that, by rotating the shaft 38, rotative movement will be transmitted to the rod 34 with the result that the ailerons 26 and 27 may be shifted about their hinges 30, as shown in dotted lines in Figure 4. Attention is called to the fact that, inasmuch as the bearing straps 31 receive the end portions 32 of the cranks 33, said cranks will be limited in their movement and will thus be prevented from becoming disengaged from the flaps of the ailerons.

Extending between pairs of the sub-frames at spaced points along the wing are anchoring rods 41. The rods 41 provide anchoring means for corresponding forward ends of expansible members preferably in the form of resilient straps 42 which straps extend rearwardly of the wing and are partially trained about the rod 34 and have their inner ends connected with the strip 9 which, as pointed out hereinbefore, forms a part of the skeleton frame 8.

As best seen in Figures 2 and 3, the upper rear edge portion of the covering material 14, which portion is carried at the rear edge of the frame 8, overlies the lower rear edge portion of the covering material which itself overlies the block 7. It is also desired to point out that the skeleton frame 8 is flexible and that, therefore, the rear edge portion of the covering material on said frame will, when the frame is flexed, move with respect to the trailing edge block 7 and against the tension of the resilient straps 42.

It is now desired to describe in more detail the operation of my improved airplane wing. When the pilot desires to take off, it is desirable that the camber of the wing be increased for imparting greater lift to said wing. In order to increase the camber of my improved wing, it is only necessary for the pilot to rotate the shaft 20, by means of the crank 23, for rotating the cam shaft 15. When this is done, the cams 16' will be swung upwardly, as shown in Figure 3, and the skeleton frame 8 will be flexed upwardly. During the upward flexing movement, the strips 11 will swing about the pivots defined by the hinges 13. It will thus be seen that although the frame may flex upwardly, the forward end of said frame will be limited against movement toward or away from the leading edge block 6. The rear edge portion of the frame 8 will be drawn forwardly over the trailing edge block 7 by the upward flexing movement of the frame 8 and said forward movement will, of course, shift the strip 9 forwardly. Upward flexing of the frame 8, with consequent forward movement of the rear edge portion thereof, will, of course, place the straps 42 under tension. That is to say, when the strip 9 is moved forwardly, the straps 42 will be extended under tension for retaining the frame 8 taut.

It has been found that, when the camber of the wing is increased in the manner hereinbefore described, the lifting effect of the wing will be materially increased. However, when the camber is increased, greater drag will be imposed with the result that speed of the ship will be reduced. After the ship has reached a desired altitude and greater speed is demanded, the crank 23 is rotated in the opposite direction for swinging the cams 16 downwardly to the position shown in Figure 2. The resilient straps 42 will assist the skeleton frame 8 in returning to retracted position in which position the drag of the wing is reduced to a minimum. Maximum speed from the craft may then be obtained.

As hereinbefore pointed out, rotation of the shaft 38 will swing the flaps 29 of the ailerons about the hinges 30 thereof for assisting in maneuvering the ship. The vertical fins 24 and 25 will also assist in maneuvering the craft.

From the foregoing, it will be understood that I have provided an airplane wing which, in one adjusted position, will be capable of exerting maximum lifting effort and, in another adjusted position will permit the craft to obtain maximum speed.

My improved airplane wing is simple in construction and will be highly efficient in use.

Having thus described the invention, what is claimed as new is:

1. An airplane wing including a main frame, a resilient skeleton frame connected with the main frame and including a plurality of strips, a covering for the frames, a rod mounted on and extending transversely of the main frame in spaced relation to the trailing edge of the wing, a resilient strap extending over said rod and having one end thereof anchored to the main frame and its other end connected with the skeleton frame, and means on the main frame and shiftable for flexing said skeleton frame with respect to the main frame for changing the camber of the wing, said means including a cam shaft, and cams on the cam shaft and engageable with the strips.

2. An airplane wing including a main frame having blocks defining a leading edge and a trailing edge, a covering for the under side of the frame, a resilient skeleton frame comprising a plurality of spaced resilient strips and longitudinally extending strips connecting said spaced resilient strips, means hingedly connecting the forward edge of the resilient skeleton frame with the leading edge block, said covering extending about the leading edge and over said resilient skeleton frame in engagement with the strips, the rear end edge portion of said resilient skeleton frame being movable above the trailing edge block, a cam shaft journaled on the main frame, a plurality of rocker arms on said shaft and terminating in cams, said cams being engageable with the first-mentioned strips, a sector gear on the cam shaft, a worm gear meshing with the sector gear, a shaft for the worm gear, said last-mentioned shaft being rotatable for communicating movement to the rocker arms through the sector and worm gears for engaging the cams with the strips for shifting the resilient skeleton frame with respect to the main frame whereby the camber of the wing will be changed, a rod mounted on and extending transversely of the wing near the trailing edge thereof, and resilient straps connected with the rear end edge portion of the skeleton frame and passing around said rod and anchored to the main frame.

3. An airplane wing including a main frame, a resilient skeleton frame connected with the main frame and including a plurality of elongated strips disposed in parallel relation and extending between the leading and trailing edges of the wing, a covering about said main and skeleton frames, a rod mounted on the main frame and disposed in parallel relation with said trailing edge, an elongated transverse narrow strip secured to said first strips adjacent the rear thereof, a plurality of resilient straps fixed relative to said main frame, engaging about said rod and fixed to said transverse strip, and means engageable with said resilient strips for flexing the latter against the tension of said straps to thereby distort said covering and effect a change in the camber of the wing.

4. An airplane wing as set forth in claim 3 wherein said means for flexing said resilient strips includes rockable cams.

EGBERT V. SMITH.